3,182,064
α-[2-(4-PYRIDYL)ETHYL]AMINOPROPIONIC ACID DERIVATIVES
Seymour L. Shapiro, Hastings on Hudson, Louis Freedman, Bronxville, and Marvin J. Karten, Yonkers, N.Y., assignors to U.S. Vitamin & Pharmaceutical Corporation, New York, N.Y., a corporation of Delaware
No Drawing. Filed May 24, 1961, Ser. No. 112,192
6 Claims. (Cl. 260—295)

This invention is concerned with novel α-[2-(4-pyridyl)ethyl]aminopropionic acid derivatives which have unique pharmacological activity, a low order of toxicity, and which are particularly effective upon administration orally, in lowering blood cholesterol levels. Additionally, these compounds act in the absence of cardiovascular, or central nervous system side effects.

The novel compounds of this invention may be represented by the formula below:

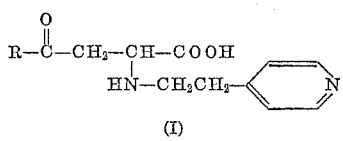

(I)

wherein R is selected from substituents such as hydroxyl, alkoxyl, amido, substituted amido, and NHOH groups.

The preferred embodiments of this invention are the compounds wherein R is an alkoxyl group and embraces lower alkoxy, cycloalkoxy, and aralkoxy derivatives, to provide α-[2-(4-pyridyl)ethyl] - β - carboalkoxypropionic acids.

The compounds of this invention are notably unique in that a variety of closely related analogs, substituting for the 4-pyridylethyl group at the α position, do not afford the noted hypocholesteremic effect.

The carbon atom α to the carboxyl group is asymmetric and this invention embodies the $d$ and $l$, as well as the $dl$ racemate herein described.

The noted high melting points of these compounds which have substituent amino groups and carboxyl groups suggest the structural formula is of a betaine type as shown below:

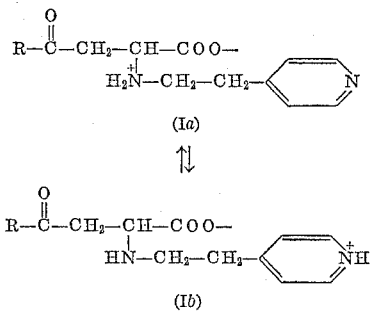

By virtue of the presence of these salt forming groups, the compounds are amphoteric and can form salts with the non-toxic inorganic acids such as hydrochloric, hydrobromic, sulfuric, nitric, phosphoric, and, in general, the monoacid addition salts are preferred. In turn, if desired, salts can be formed at the carboxyl group with the alkali metals, or calcium or magnesium ions, as well as the non-toxic strongly basic amines.

For the preparation of the compounds of this invention, the most convenient route involves formation of mono substituted maleic ester and addition of the 2-(4-pyridyl)ethylamine across the double bond, following the equation below:

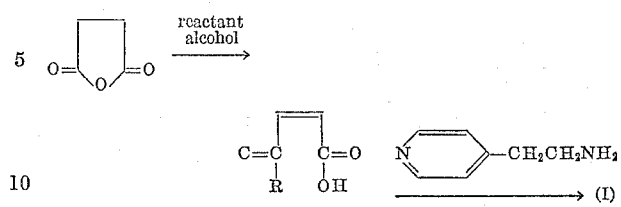

It is preferable to isolate the product after a short heating period and to purify it by granulation under acetone.

Of interest, is the fact that a similar reaction with the related secondary amine, N-methyl-2-(4-pyridyl)ethylamine results in expulsion of the 4-pyridylethyl group; and formation of α-methylamino-β-carbomethoxypropionic acid. This reaction also distinguishes the novel chemical character of the compounds of this invention, particularly since other secondary amines readily condense in the reaction system described above to give secondary amino substituents in the α position.

Typical examples which are in no sense limiting will be given below:

EXAMPLE 1

*α-[2-(4-pyridyl)ethyl]amino-β-carbomethoxypropionic acid*

A solution of 5.0 g. (0.054 mole) of maleic anhydride in 15 ml. of methanol was heated under reflux for 0.5 hour, cooled, and treated with 10 ml. of pyridine and 6.1 g. (0.05 mole) of 4-(2-aminoethyl)pyridine. After heating at 110° C. (oil bath) for 15 minutes and cooling, the formed product was filtered, and on trituration with acetone, gave 8.67 g. (69.0%) of product, M.P. 192° C., recrystallized (acetone-water), M.P. 198° C.

*Analysis.*—Calcd. for $C_{12}H_{16}N_2O_4$: C, 57.1; H, 6.4; N, 11.1. Found: C, 57.3; H, 6.7; N, 10.9.

Upon treatment with one equivalent of hydrogen chloride in methanol, the hydrochloride of the subject compound is formed.

EXAMPLE 2

*α-[2-(4-pyridyl)ethyl]amino-β-carboethoxypropionic acid*

A solution of 10.0 g. (0.11 mole) of maleic anhydride in 45 ml. of ethanol was heated under reflux for 0.5 hour, cooled, and treated with 20 ml. of pyridine and 12.2 g. (0.1 mole) of 4-(2-aminoethyl)pyridine. After heating at 110° C. (oil bath) for 10 minutes, and cooling, the product was separated and triturated with acetone to give 15.0 g. (56.5%), M.P. 206–207° C.

*Analysis.*—Calcd. for $C_{13}H_{18}N_2O_4$: C, 58.6; H, 6.8; N, 10.5. Found: C, 58.2; H, 6.7; N, 10.9.

EXAMPLE 3

*α-[2-(4-pyridyl)ethyl]amino-β-carbopropoxypropionic acid*

A solution of 5.0 g. (0.054 mole) of maleic anhydride in 25 ml. of n-propanol was heated under reflux for 0.5 hour, cooled, and treated with 10 ml. of pyridine and 6.1 g. (0.05 mole) of 4-(2-aminoethyl)pyridine. After heating at 110° C. (oil bath) for 0.5 hour, and cooling, the product was separated and, after trituration with acetone, gave 8.7 g. (62.1%), M.P. 208–210° C.

*Analysis.*—Calcd. for $C_{14}H_{20}N_2O_4$: C, 63.7; H, 7.6; N, 8.7. Found: C, 63.9; H, 7.6; N, 9.1.

In a similar manner, using n-butanol, n-amyl alcohol and n-hexyl alcohol as the reactant alcohols, the corresponding β-carboalkoxypropionic acids are obtained.

EXAMPLE 4
α-[2-(4-pyridyl)ethyl]amino-β-carbocyclohexyloxypropionic acid

A solution of 5.0 g. (0.054 mole) of maleic anhydride in 50 ml. of cyclohexanol was heated under reflux for 0.5 hour, cooled, and treated with 10 ml. of pyridine and 6.1 g. (0.05 mole) of 4-(2-aminoethyl)pyridine. After heating at 110° C. for 20 minutes, and cooling, the product was separated and, after trituration with acetone, gave 0.5 g. (59.4%), M.P. 205° C.

*Analysis.*—Calcd. for $C_{17}H_{24}N_2O_4$: C, 63.7; H, 7.6; N, 8.7. Found: C, 63.9; H, 7.6; N, 9.1.

When cyclopentanol, or 4-methylcyclohexanol is substituted for cyclohexanol as described above, there is obtained the corresponding α-[2-(4-pyridyl)ethyl]-β-carbocycloalkoxypropionic acids.

In a similar manner using benzyl alcohol, or phenethyl alcohol as the reactant alcohol, the corresponding β-carboaralkoxypropionic acids may be obtained.

Illustrative of the utility of the compounds of this application are the results with α-[2-(4-pyridyl)ethyl]-β-carbomethoxypropionic acid which reflect its capacity to reduce cholesterol levels. To evaluate this pharmacologic property, the compound was given to normal adult guinea pigs at an oral dose corresponding to 60 mg./kg. at the beginning of the experiment, 24 hours later, and finally, 48 hours later. Blood samples were drawn for the determination of serum cholesterol levels at the initiation of the experiment and after 72 hours. At the 72 hour interval, the serum cholesterol value was reduced 50.7% from the control value.

The pattern of lack of toxicity is noted in that the compound was not toxic upon subcutaneous administration to mice at 1000 mg./kg.

Upon intravenous administration (anesthetized dog) at 5 mg./kg., it was without effect on blood pressure, heart rate, and respirataion and did not influence the effect of histamine, adrenaline, or acetlycholine. Upon evaluation as an analgesic (300 mg./kg.), or central nervous system depressant (200 mg./kg.) it was without effect.

The compounds of this invention are desirably formulated as tablets, or capsules containing from 50–200 mg. of the active ingredient in dosage unit form. These dosage forms are suitably compounded with extenders, fillers and lubricants, prepared in a conventional manner. Alternative dosage formulations are sustained release tablets or capsules prepared in a conventional manner, or injectables, which are preferably supplied as sterile solutions of the corresponding hydrochlorides.

In addition, this invention encompasses mixtures of the compounds herein described with each other, or with other active drugs.

It is to be understood that it is intended to cover all changes and modifications of the examples of this invention herein chosen for the purpose of illustration which do not constitute departures from the spirit and scope of the invention.

We claim:
1. The compound

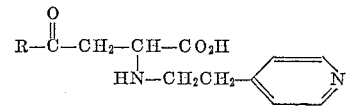

wherein R is selected from the group consisting of lower alkoxy, cycloalkoxy having from 5 to 7 carbon atoms, benzyloxy, and phenethoxy.

2. The compound

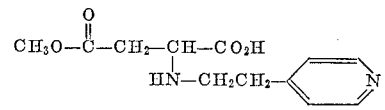

3. The compound

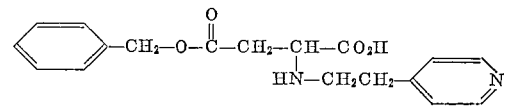

4. The compound

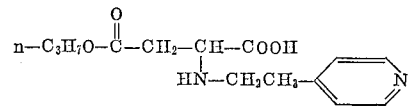

5. The compound

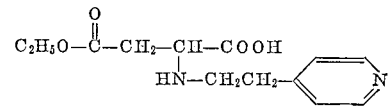

6. The compound

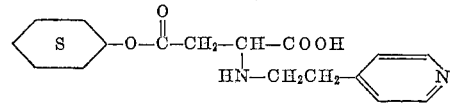

References Cited by the Examiner
UNITED STATES PATENTS

| | | | |
|---|---|---|---|
| 2,899,437 | 8/59 | Shapiro et al. | 260—295 |
| 2,937,117 | 5/60 | Cotlet et al. | 167—65 |
| 2,945,040 | 7/60 | Leditschke et al. | 260—295 |
| 2,965,542 | 12/60 | Castaigne | 167—65 |
| 2,970,082 | 1/61 | Miale | 167—65 |
| 2,994,700 | 8/61 | Krapcho | 260—295 |

IRVING MARCUS, *Primary Examiner.*

D. T. McCUTCHEN, NICHOLAS S. RIZZO, *Examiners.*

UNITED STATES PATENT OFFICE
CERTIFICATE OF CORRECTION

Patent No. 3,182,064                         May 4, 1965

Seymour L. Shapiro et al.

It is hereby certified that error appears in the above numbered patent requiring correction and that the said Letters Patent should read as corrected below.

Column 2, lines 7 to 10, the first formula should appear as shown below instead of as in the patent:

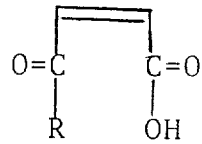

Signed and sealed this 14th day of September 1965.

(SEAL)
Attest:

ERNEST W. SWIDER                         EDWARD J. BRENNER
Attesting Officer                           Commissioner of Patents